United States Patent Office 3,749,733
Patented July 31, 1973

3,749,733
4 - (2 - BENZOYLPHENYL)-2,4-DIHYDRO-5[(ALKYL-AMINO)ALKYL] - 3H - 1,2,4 - TRIAZOL-3-ONES AND PROCESS
Jackson B. Hester, Jr., Galesburg, Mich., assignor to The Upjohn Company, Kalamazoo, Mich.
No Drawing. Filed Dec. 29, 1971, Ser. No. 213,816
Int. Cl. C07d 55/06
U.S. Cl. 260—308 C          7 Claims

ABSTRACT OF THE DISCLOSURE

A 4 - (2 - benzoylphenyl) - 2,4 - dihydro - 5 - [(alkylamino) - alkyl] - 3H - 1,2,4 - triazol-3-one of the formula

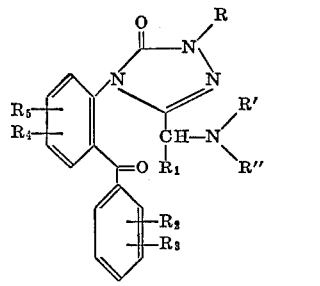

(IV)

wherein R, R', and $R_1$ are hydrogen or alkyl of 1 to 3 carbon atoms, inclusive; wherein $R_2$, $R_3$, $R_4$, and $R_5$ are selected from the group consisting of hydrogen, alkyl defined as above, fluoro, chloro, bromo, nitro, cyano, trifluoromethyl, and alkoxy, alkylthio, alkylsulfinyl, and alkylsulfonyl in which the carbon moieties are of 1 to 3 carbon atoms, inclusive, and dialkylamino in which alkyl is defined as above; and wherein R'' is alkyl defined as above, is prepared by treating a 2,4-dihydro-6-phenyl-1H-s - triazolo[4,3 - a][1,4]benzodiazepin - 1 - one of the Formula I:

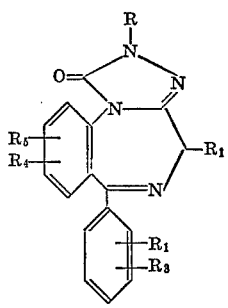

(I)

wherein R, $R_1$, $R_2$, $R_3$, $R_4$, and $R_5$ are defined as above, with a trialkyloxonium fluoroborate $(R'')_3O^+BF^-$ in which R'' is defined as above and hydrolyzing the complex thus produced, with an aqueous base. The product (II) thus obtained can be alkylated to give compounds of Formula III.

The compounds of Formula IV (combination of II and III) and the pharmacologically acceptable acid addition salts thereof are useful sedatives and tranquilizers for mammals and birds.

BACKGROUND OF THE INVENTION

Field of the invention

This invention is directed to new organic compounds and is particularly concerned with novel 4-(2-benzoylphenyl) - 2,4 - dihydro - 5[(alkylamino)alkyl]-3H-1,2,4-triazol-3-ones (II and III) and a process for the production thereof.

The novel compounds and the process of production therefor can be illustratively represented as follows:

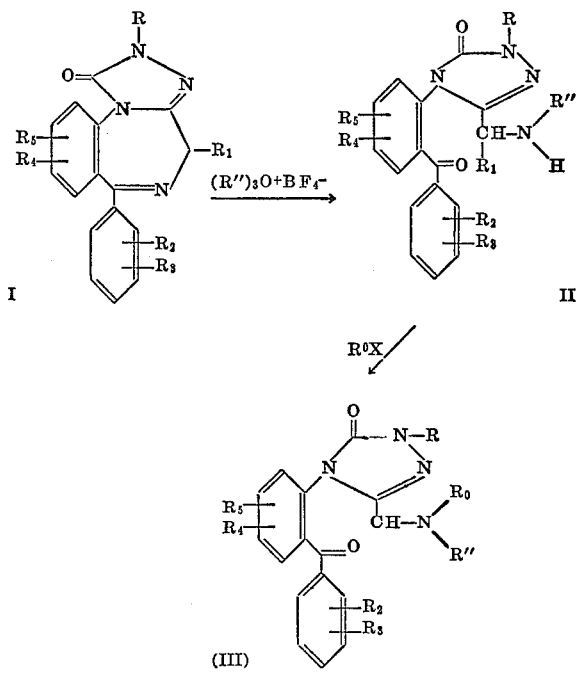

wherein R and $R_1$ are hydrogen or alkyl of 1 to 3 carbon atoms, inclusive; wherein $R_2$, $R_3$, $R_4$, and $R_5$ are selected from the group consisting of hydrogen, alkyl defined as above, fluoro, chloro, bromo, nitro, cyano, trifluoromethyl, and alkoxy, alkylthio, alkylsulfonyl, and alkylsulfinyl in which the carbon moieties are of 1 to 3 carbon atoms inclusive, and dialkylamino in which alkyl is defined as above; and wherein $R_0$ and R'' are alkyl as defined above.

The active compounds of this invention can be therefore presented by the summary (combining structures II and III) Formula IV:

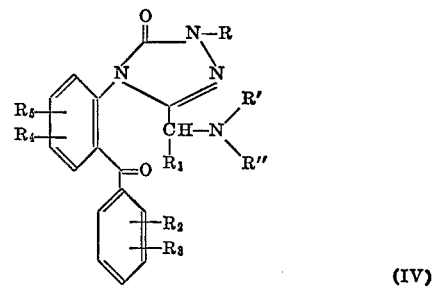

(IV)

wherein R, R', and $R_1$ are hydrogen or alkyl of 1 to 3 carbon atoms, inclusive; wherein $R_2$, $R_3$, $R_4$, and $R_5$ are selected from the group consisting of hydrogen, alkyl defined as above, fluoro, chloro, bromo, nitro, cyano, trifluoromethyl, and alkoxy, alkylthio, alkylsulfinyl, and alkylsulfonyl in which the carbon moieties are of 1 to 3 carbon atoms, inclusive, and dialkylamino in which alkyl is defined as above; and wherein R'' is alkyl as defined as above.

The invention also includes the pharmacologically acceptable acid addition salts of the compounds of Formula IV above.

The process of this invention comprises: treating between 4–50° C. a compound of Formula I with a trialkyloxonium fluoroborate in an inert solvent, and hydrolyzing the resulting complex compound to obtain a compound of Formula II. Compound II, if desired, can be alkylated with an alkyl halide and a base to give the Compound III.

Treating compounds of Formulae II or III with an acid produces the corresponding acid addition salts of these compounds i.e. of Compounds IV.

DESCRIPTION OF THE PREFERRED EMBODIMENT

Alkyl groups of up to 3 carbon atoms, inclusive, are exemplified by methyl, ethyl, propyl, and isopropyl.

The carbon chain moiety of alkoxy, alkylthio, alkylsulfinyl, and alkylsulfonyl, which is of 1 to 3 carbon atoms, inclusive, is defined as alkyl of 1 to 3 carbon atoms, inclusive, as above.

Examples of alkoxy are methoxy, ethoxy, propoxy and isopropoxy; examples of alkylthio are methylthio, ethylthio, propylthio, and isopropylthio; examples of alkylsulfonyl are methylsulfonyl, ethylsulfonyl, propylsulfonyl, and isopropylsulfonyl; examples of alkylsulfinyl are methylsulfinyl, ethylsulfinyl, propylsulfinyl, and isopropylsulfinyl; examples of dialkylamino are dimethylamino, diethylamino, dipropylamino, and diisopropylamino.

The novel compounds of the Formula IV including acid addition salts thereof have sedative, tranquilizing, muscle-relaxant and anti-aggressive behavior effects in mammals and birds and can be also used as feed additives in farm animals.

The acid addition salts of compounds of Formula IV contemplated in this invention are the hydrochlorides, hydrobromides, hydriodides, sulfates, phosphates, acetates, lactates, tartrates, citrates, salicylates, succinates, maleates, pamoates, cyclohexanesulfamates, benzenesulfonates, toluenesulfonates, methanesulfonates, and the like, prepared by reacting a compound of Formula II or III with the stoichiometrically calculated amount of the selected pharmacologically acceptable acid.

The sedative effects of 4-(2-benzoyl-4-chlorophenyl)-2,4-dihydro-5-[(methylamino)methyl] - 2H - 1,2,4 - triazol-3-one are shown by the following tests in mice:

Chimney test [Med. Exp. 4, 145 (1961)]: The effective (intraperitoneal) dosage for 50% of mice $ED_{50}$ is 1.6 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equal the dose of test compound at which 50% of the mice remain in the dish. $ED_{50}$ (intraperitoneal administration) in this test was 4 mg./kg.

Pedestal test: The untreated (control) mouse leaves the pedestal in less than a minute to climb back to the floor of the standard mouse box. Tranquilized mice will stay on the pedestal more than 1 minute. The $ED_{50}$ (intraperitoneal administration) for the test compound, 4-(2-benzoyl-4-chlorophenyl)-2,4-dihydro - 5 - [(methylamino)methyl]-3H-1,2,4-triazol-3-one was 12 mg./kg.

Nicotine antagonism test: Mice in a group of 6 are injected with the test compound 4-(2-benzoyl-4-chlorophenyl) - 2,4 - dihydro - 5 - [(methylamino)methyl]-3H-1,2,4-triazol-3-one. Thirty minutes later the mice, including control (untreated) mice, are injected with 2 mg./kg. nicotine salicylate. The control mice show overstimulation, i.e., (1) running convulsions followed by (2) tonic extensor fits; followed by (3) death. An intraperitoneal dosage of 0.45 mg./kg. of the test compound protected 50% of the mice against (2) and 0.56 mg./kg. against (3).

The pharmaceutical forms contemplated by this invention include pharamaceutical compositions suited for oral, parenteral and rectal use, e.g., tablets, pills, powder packets, cachets, dragées, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil, or water may be used for preparing solutions or suspensions of the active drug. Sweetening, coloring, and flavoring agents may be added.

For mammals and birds, food premixes with starch, oatmeal, dried fishmeat, fishmeal, flour and the like can be prepared.

As tranquilizer the compounds of Formula IV can be used in dosage of 0.1–10 mg./kg. in oral or injectable preparations as described above, to alleviate tension and anxiety in mammals or birds, such as e.g., occurs when animals (dogs, cats, horses, cattle, zoo animals) are in travel.

For weight gain, increase in food efficiency, increase in milk or egg production from 1–100 g. of a compound of Formula IV is added per ton of feed.

Other acid addition salts of the compounds of Formulae II and III can be made such as the fluosilicic acid addition salts which are useful mothproofing compounds or the trichloroacetates useful as herbicides against Johnson grass, Bermuda grass, yellow foxtail, green foxtail and quack grass.

The starting materials of Formula I of this invention, substituted or unsubstituted 2,4-dihydro-6-phenyl-1H-s-triazolo[4,3-a][1,4]benzodiazepin-1-ones are prepared as shown in the preparations and in British patent specification 1,254,403.

In carrying out the process of this invention the starting Compound I, a selected 2,4-dihydro-6-phenyl-1H-s-triazolo[4,3-a][1,4]benzodiazepin-1-one, in an inert organic solvent e.g. methylene chloride, ethylene chloride, chloroform, dioxane, tetrahydrofuran, and the like, is reacted with a trialkyloxonium fluoroborate $(R'')_3O^+BF_4^-$ wherein $R''$ is alkyl of 1 to 3 carbon atoms, inclusive. In the preferred embodiment of this invention the reaction is carried out at room temperature (20–30° C.), but temperatures between 0–50° C. are operative. The trialkyloxonium fluoroborate is used in a slight excess such as 5–25% over the calculated amount.

The reaction period is between 1–48 hours. Thereafter the product, or complex, is isolated preferably by concentration, and then hydrolyzed without purification in an aqueous base, e.g., aqueous solutions of sodium or potassium carbonate. The hydrolysis reaction is carried out between 0–30° C. during 30–240 minutes resulting in Compound II. Compound II is isolated and purified by conventional means, such as extraction, crystallization, chromatography, or the like.

If a compound of Formula IV is desired wherein R' is alkyl a conventional alkylation is carried out with Compound II e.g. mixing Compound II with about an equimolecular amount of an alkyl halide R'X, in which X is preferably bromine or iodine and R' is as defined above, in a base such as potassium or sodium carbonate or potassium or sodium hydroxide in an alkanol, e.g. methanol, ethanol, propanol, or the like, between 0° to 50° C. for 1 to 6 days. Thereafter the product can be obtained by evaporation, extraction or the like and purified by crystallization chromatography, or the like.

The following preparation and examples are illustrative of the processes and products of the present invention, but are not to be construed as limiting.

PREPARATION 1

8-chloro-2,4-dihydro-6-phenyl-1H-s-triazolo[4,3-a][1,4]benzodiazepin-1-one (A) 3 - (7 - chloro-5-phenyl-3H-1,4-benzodiazepin-2-yl)-carbazic acid ethyl ester.

A mixture of 7-chloro-1,3-dihydro-5-phenyl-2H-1,4-benzodiazepine-2-thione (1.43 g.; 0.005 mole), ethyl carbazate (1.29 g.; 0.015 mole) and absolute ethanol (50 ml.) was refluxed for 14 hours with a slow stream of nitrogen bubbling through the mixture. The mixture was then concentrated to give a residue and the residue was crystallized from methylene chloride-ethyl acetate to give 1.38 g. (77% yield) of 3-(7-chloro-5-phenyl-3H-1,4-benzodiazepin-2-yl)carbazic acid ethyl ester of melting point 195.5–197.5° C. (dec.). The analytical sample, prepared by recrystallization from the above solvent mixture, had a melting point of 198–199° C. (dec.).

Analysis.—Calcd. for $C_{18}H_{17}ClN_4O_2$ (percent): C, 60.59; H, 4.80; Cl, 9.94; N, 15.70. Found (percent): C, 60.57; H, 4.73; Cl, 9.98; N, 15.40.

(B) 8 - chloro - 2,4 - dihydro-6-phenyl-1H-s-triazolo [4,3-a][1,4]benzodiazepin-1-one.

3 - (7 - chloro-5-phenyl-3H-1,4-benzodiazepin)-1-yl) carbazic acid ethyl ester (0.50 g.; 0.0014 mole) was heated under nitrogen at 197–207° C. for 15 minutes. The cooled melt was crystallized from ethanol to give 0.28 g. of 8-chloro-2,4-dihydro-6-phenyl-1H-s-triazolo[4,3-a] [1,4]benzodiazepin-1-one, which on recrystallization from ethanol had a melting point of 255–256° C.

Analysis.—Cald. for $C_{16}H_{11}ClN_4O$ (percent): C, 61.84; H, 3.57; Cl, 11.41; N, 18.03. Found (percent): C, 61.44; H, 3.57; Cl, 11.46; N, 17.90.

PREPARATION 2

8-chloro-2,4-dihydro-2-methyl-6-phenyl-1H-s-triazolo [4,3-a][1,4]benzodiazepin-1-one and its hydrochloride A solution of 1.0 g. of 8-chloro-2,4-dihydro-6-phenyl-1H-s-triazolo[4,3-a][1,4]benzodiazepin-1-one in 25 ml. of dry dimethylformamide in a nitrogen atmosphere was treated with 0.145 g. of sodium hydride (a 58% suspension of NaH in mineral oil). This mixture was heated on the steam bath for 15 minutes resulting in a solution. This solution was cooled in an ice-bath and thereto was added 0.5 g. of methyl iodide in about 5 ml. of ether. After stirring the reaction mixture for 18 hours at about 22–24° C., the mixture was concentrated and the resulting residue chromatographed over 100 g. of silica gel with an ethyl acetate-cyclohexane (in 1:1 by volume ratio) solution. Fractions 9–15 (20 ml. each) contained the desired product. Evaporation of these fractions gave oily 8 - chloro - 2,4 - dihydro-2-methyl-6-phenyl-1H-s-triazolo [4,3-a][1,4]benzodiazepin-1-one. The latter was converted with ethereal hydrogen chloride to its hydrochloride salt to give 0.4 g. of 8-chloro-2,4-dihydro-2-methyl-6 - phenyl - 1H-s-triazolo[4,3-a][1,4]benzodiazepin-1-one hydrochloride which after recrystallization from methanol-ethyl acetate had a melting point of 224–235° C.

Analysis.—Calcd. for $C_{17}H_{13}ClN_4O \cdot HCl$ (percent): C, 56.52; H, 3.91; Cl, 19.63; N, 15.51. Found (percent): C, 56.27; H, 4.00; Cl, 19.49; N, 15.44.

8 - chloro - 2,4 - dihydro - 2 - methyl-6-phenyl-1H-s-triazolo[4,3-a][1,4]benzodiazepin-1-one was also obtained by reacting 8-chloro-2,4-dihydro-6-phenyl-1H-s-triazolo[4,3-a][1,4]benzodiazepin - 1 - one in methylene chloride and methanol with diazomethane at about 0–5° C.

In the manner given in Preparations 1 and 2, other 2,4 - dihydro-6-phenyl-1H-s-triazolo[4,3-a][1,4]benzodiazepin-1-ones (I) can be made. Representative compounds thus obtained include:

8-chloro-2-ethyl-2,4-di-hydro-6-phenyl-1H-s-triazolo-[4,3-a][1,4]benzodiazepin-1-one;
8-chloro-2,4-dihydro-6-(o-chlorophenyl)-1H-s-triazolo-[4,3-a][1,4]benzodiazepin-1-one;
8-nitro-2,4-dihydro-6-(o-chlorophenyl)-1H-s-triazolo-[4,3-a][1,4]benzodiazepine-1-one;
8-chloro-2,4-dihydro-6-(2,6-difluorophenyl)-1H-s-triazolo[4,3-a][1,4]benzodiazepin-1-one;
7,8-dicyano-2,4-dihydro-6-(m-fluorophenyl)-1H-s-triazolo[4,3-a][1,4]benzodiazepin-1-one;
9-trifluoromethyl-2-ethyl-2,4-dihydro-6-phenyl-1H-s-triazolo[4,3-a][1,4]benzodiazepin-1-one;
4,8,9-trimethyl-2,4-dihydro-6-(p-isopropylphenyl)-1H-s-triazolo[4,3-a][1,4]benzodiazepin-1-one;
10-ethoxy-2-methyl-2,4-dihydro-6-(p-propylthiophenyl)-1H-s-triazolo[4,3-a][1,4]benzodiazepin-1-one;
7-ethylsulfinyl-2,4-dihydro-6-(2,4-dimethoxyphenyl-1H-s-triazolo[4,3-a][1,4]benzodiazepin-1-one;
8-ethylsulfonyl-2-methyl-2,4-dihydro-6-(p-diethylaminophenyl)-1H-s-triazolo[4,3-a][1,4]benzodiazepin-1-one;
8,10-dibromo-4-ethyl-2,4-dihydro-6-phenyl-1H-s-triazolo-[4,3-a][1,4]benzodiazepin-1-one;
7-fluoro-2,4-dipropyl-2,4-dihydro-6-(m-nitrophenyl)-1H-s-triazolo[4,3-a][1,4]benzodiazepin-1-one;
7-methyl-9-bromo-2,4-dihydro-6-(o-cyanophenyl)-1H-s-trizolo[4,3-a][1,4]benzodiazepin-1-one;
8-ethylthio-2-methyl-2,4-dihydro-6-(2,4-dipropylphenyl)-1H-s-triazolo[4,3-a][1,4]benzodiazepin-1-one;
9-propylsulfonyl-2-methyl-2,4-dihydro-6-(2,6-dichlorophenyl)-1H-s-triazolo[4,3-a][1,4]benzodiazepin-1-one; and the like.

EXAMPLE 1

4-(2-benzoyl-4-chlorophenyl)-2,4-dihydro-5-[(methylamino)methyl]-3H-1,2,4-triazol-3-one Trimethyloxonium fluoroborate (0.488 g., 0.0033 mole) was added, under nitrogen, to a stirred suspension of 8-chloro - 2,4 - dihydro-6-phenyl-1H-s-triazolo[4,3-a] [1,4]benzodiazepin-1-one (0.933 g., 0.003 mole) in methylene chloride (20 ml.) and the mixture was kept at ambient temperature for 18 hours. The solid complex was collected by filtration, washed with methylene chloride and suspended in a mixture of methylene chloride and aqueous potassium carbonate. When the complex had decomposed the layers were separated and the aqueous layer was extracted with chloroform. The combined organic solutions were washed with brine, dried over anhydrous potassium carbonate and concentrated. A solution of the residue in ethyl acetate was acidified with ethereal hydrochloric acid. The solid was collected by filtration, washed with ethyl acetate and crystallized from methanol-ethyl acetate to give 0.067 g. of an unknown, of melting point 238–270.5° C. The mother liquor was concentrated, and the residue was dissolved in water and decolorized with Darco G60 activated charcoal. The resulting solution was cooled in an ice bath, made alkaline with sodium hydroxide and extracted with chloroform. The extract was washed with brine, dried over anhydrous potassium carbonate and concentrated. The residue was crystallized from ethyl acetate to give 0.398 g. of 4-(2-benzoyl - 4 - chlorophenyl) - 2,4 - dihydro - 5 - [(methylamino)methyl]-3H-1,2,4-triazol-3-one of melting point 139–142.5° C. The analytical sample had a melting point of 138–139° C.

Analysis.—Calcd. for $C_{17}H_{15}ClN_4O_2$ (percent): C, 59.56; H, 4.41; Cl, 10.34; N, 16.35. Found (percent): C, 59.73; H, 4.52; Cl, 10.41; N, 16.61.

EXAMPLE 2

4-(2-benzoyl-4 - chlorophenyl) - 2,4-dihydro-2-methyl-5-[(methylamino)methyl]-3H - 1,2,4-triazol-3-one and its hydrochloride A stirred suspension of 8-chloro-2-methtyl-2,4-dihydro-6-phenyl-1H-s-triazolo[4,3-a][1,4]benzodiazepin - 1 - one hydrochloride (1.05 g., 0.00292 mole) in methylene chloride and water was made alkaline with 15% aqueous sodium hydroxide. The layers were separated and the aqueous layer was extracted with methylene chloride. The combined methylene chloride layers were dried and concentrated. The residue was dissolved in benzene and the solution was concentrated in vacuo. A solution of this residue in dry methylene chloride (20 ml.) was treated with trimethyloxonium fluoroborate (0.526 g.; 0.0036 mole). After about 5 minutes a thick precipitate had formed. Additional methylene chloride (10 ml.) was added and the mixture was stirred under nitrogen at ambient temperature for 18 hours. The solid was collected by filtration, washed with methylene chloride and suspended in a mixture of methylene chloride and aqueous potassium carbonate. After about 10 minutes of vigorous stirring a clear methylene chloride solution was obtained. The layers were separated and the aqueous layer was extracted with methylene chloride. The combined organic layers were washed with brine, dried over anhydrous potassium carbonate and concentrated. A solution of the residue in ethyl acetate was acidified with methanolic hydrogen chloride and the salt was crystallized to give 0.64 g. of 4-(2-benzoyl-4-chlorophenyl)-2,4-dihydro-2-methyl-5-[(methylamino)methyl] - 3H - 1,2,4-triazol-3-one as the hydrochloride of melting point 177–180° C. dec. The analytical sample had a melting point of 175–177° C. dec.

Analysis.—Calcd. for $C_{18}H_{18}Cl_2N_4O_2$ (percent): C, 54.97; H, 4.61; Cl, 18.03; N, 14.25. Found (percent): C, 54.63; H, 4.76; Cl, 17.89; N, 13.95.

Treating the hydrochloride with aqueous sodium carbonate, extracting the mixture with methylene chloride and evaporating the solvent gave the pure free base.

EXAMPLE 3

4-[2-(o-chlorobenzoyl) - 4 - nitrophenyl]-2,4-dihydro-5-[(ethylamino)methyl]-3H-1,2,4-triazol-3-one In the manner given in Example 1, 8-nitro-2,4-dihydro-6-(o-chlorophenyl) - 1H-s - triazolo[4,3-a][1,4]benzodiazepin-1-one was treated with triethyloxonium fluoroborate in chloroform, the thus obtained complex was collected by filtration and then hydrolyzed with aqueous sodium hydroxide to give 4-[2-(o-chlorobenzoyl)-4-nitrophenyl]-2,4-dihydro-5-[(ethylamino)methyl] - 3H-1,2,4-triazol-3-one.

EXAMPLE 4

4-[2-(o-chlorobenzoyl)-4-chlorophenyl]-2,4-dihydro-5-[(methylamino)methyl]-3H-1,2,4-triazol-3-one In the manner given in Example 1, 8-chloro-2,4-dihydro-6-(o-chlorophenyl)-1H - s - triazolo[4,3-a][1,4]benzodiazepin-1-one was treated with trimethyloxonium fluoroborate in chloroform, the thus obtained complex was collected by filtration and then hydrolyzed with aqueous sodium carbonate to give 4-[2-(o-chlorobenzoyl) - 4 - chlorophenyl]-2,4-dihydro-5-[(methylamino)methyl]-3H-1,2,4-triazol-3-one.

EXAMPLE 5

4-[2-(2,6-difluorobenzoyl)-4-chlorophenyl]-2,4-dihydro-5-[(propylamino)methyl]-3H-1,2,4-triazol-3-one In the manner given in Example 1, 8-chloro-2,4-dihydro-6-(2,6 - difluorophenyl) - 1H-s-triazolo[4,3-a][1,4]benzodiazepin-1-one was treated with tripropyloxonium fluoroborate in methylene chloride, the thus obtained complex was collected by filtration and then hydrolyzed with aqueous potassium carbonate to give 4-[2-(2,6-difluorobenzoyl) - 4-chlorophenyl] - 2,4-dihydro-5-[(propylamino)methyl]-3H-1,2,4-triazol-3-one.

EXAMPLE 6

4-[2-(p-isopropylbenzoyl) - 4,5-dimethylphenyl]-2,4-dihydro-5-[1-(ethylamino)ethyl] - 3H-1,2,4 - triazol-3-one In the manner given in Example 1, 4,8,9-trimethyl-2,4-dihydro-6-(p-isopropylphenyl) - 1H-s-triazolo[4,3-a][1,4]benzodiazepin-1-one was treated with triethyloxonium fluoroborate in tetrahydrofuran, the thus obtained complex was collected by filtration and then hydrolyzed with aqueous sodium carbonate to give 4-[2-(p-isopropylbenzoyl)-4,5-dimethylphenyl] - 2,4 - dihydro-5-[1-(ethylamino)ethyl]-3H-1,2,4-triazol-3-one.

EXAMPLE 7

4-(2-benzoyl-4,6-dibromophenyl)-2,4-dihydro-5-[1-(methylamino)propyl]-3H-1,2,4-triazol-3-one In the manner given in Example 1, 8,10-dibromo-2,4-dihydro - 5 - ethyl - 6 - phenyl-1H-s-triazolo[4,3-a][1,4]benzodiazepin-1-one was treated with trimethyloxonium fluoroborate in chloroform, the thus obtained complex was collected by filtration and then hydrolyzed with aqueous potassium hydroxide to give 4-(2-benzoyl-4,6-dibromophenyl)-2,4-dihydro-5-[1 - (methylamino)propyl]-3H-1,2,4-triazol-3-one.

EXAMPLE 8

4-[2-(2,4-dipropylbenzoyl) - 4 - (ethylthio)phenyl]-2-methyl-2,4-dihydro-5-[1-(propylamino)ethyl] - 3H-1,2,4-triazol-3-one In the manner given in Example 1, 2,4-dimethyl-8-ethylthio-2,4-dihydro-6-(2,4-dipropylphenyl) - 1H-s-triazolo[4,3-a][1,4]benzodiazepin-1-one was treated with tripropyloxonium fluoroborate in chloroform, the thus obtained complex was collected by filtration and then hydrolyzed with aqueous sodium carbonate to give 4-[2-(2,4-dipropylbenzoyl) - 4 - (ethylthio)phenyl]-2,4-dihydro-5-[1-(propylamino)ethyl]-3H-1,2,4-triazol-3-one.

EXAMPLE 9

4-(2-benzoyl-4-chlorophenyl)-2,4-dihydro-2-methyl-5-[(dimethylamino)methyl]-3H-1,2,4-triazol-3-one A suspension of 1 g. of 4-(2-benzoyl-4-chlorophenyl)-2,4-dihydro-2-methyl - 5-[(methylamino)methyl] - 3H-1,2,4-triazol-3-one hydrochloride in 20 ml. of ethanol was heated with 1 g. of potassium carbonate to 35° C. After 15 minutes 0.55 g. of methyliodide was added and the mixture agitated for 48 hours. The solvent was then evaporated in vacuo and the residue extracted with chloroform. The chloroform solution was evaporated and the resulting residue twice crystallized from ethyl acetate to give 4-(2-benzoyl-4-chlorophenyl)-2,4-dihydro-2-methyl-5-[(dimethylamino)methyl]-3H-1,2,4-triazol-3-one.

EXAMPLE 10

4-[2-(o-chlorobenzoyl) - 4 - chlorophenyl]-2,4-dihydro-5-[(methylethylamino)methyl]-3H-1,2,4-triazol-3-one In the manner given in Example 9, 4-[2-(o-chlorobenzoyl)-4-chlorophenyl]2,4-dihydro-5 - [(methylamino)methyl]-3H-1,2,4-triazol-3-one was reacted with potassium carbonate and ethyl bromide to give 4-[2-(o-chlorobenzoyl)-4-chlorophenyl]-2,4-dihydro-5 - [(methylethylamino)methyl]-3H-1,2,4-triazol-3-one.

EXAMPLE 11

4-[2-(o-chlorobenzoyl)-4-nitrophenyl]-2,4-dihydro-5-[(propylethylamino)methyl]-3H-1,2,4-triazol-3-one In the manner given in Example 9, 4-[2-(o-chlorobenzoyl)-4-nitrophenyl]-2,4-dihydro - 5 - [(ethylamino)methyl]-3H-1,2,4-triazol-3-one was reacted with potassium carbonate and propyl iodide to give 4-[2-(o-chlorobenzoyl)-4-nitrophenyl]-2,4-dihydro - 5 - [(propylethylamino)methyl]-3H-1,2,4-triazol-3-one.

EXAMPLE 12

4-[2-(p-isopropylbenzoyl) - 4,5 - dimethylphenyl] - 2,4-dihydro-5-[1-(diethylamino)ethyl]-3H - 1,2,4 - triazol-3-one In the manner given in Example 9, 4-[2-(p-isopropylbenzoyl)-4,5-dimethylphenyl]-2,4-dihydro - 5 - [1-(ethylamino)-ethyl]3H-1,2,4-triazol - 3 - one was reacted with potassium carbonate and ethyl bromide to give 4-[2-(p-isopropylbenzoyl)-4,5-dimethylphenyl] - 2,4 - dihydro - 5-[1-(diethylamino)-ethyl]3H-1,2,4-triazol-3-one.

EXAMPLE 13

4-[2-(2,4-dipropylbenzoyl) - 4 - (ethylthio)phenyl] - 2,4-dihydro - 5 - [(propylethylamino)methyl] - 3H - 1,2,4-triazol-3-one In the manner given in Example 9, 4-[2-(2,4-dipropylbenzoyl)-4-(ethylthio)phenyl]-2,4-dihydro - 5 - [(propylamino)-methyl]-3H-1,2,4-triazol-3-one was reacted with potassium carbonate and ethyl bromide to give 4-[2-(2,4-dipropylbenzoyl)-4-(ethylthio)phenyl] - 2,4 - dihydro - 5 - [(propylethylamino)methyl]-3H-1,2,4-triazol-3-one.

In the manner illustrated by the preceding examples, other 4-(2 - benzoylphenyl) - 2,4 - dihydro - 5 - [(alkylamino)-alkyl]-3H-1,2,4-triazol-3-ones of Formula IV can be made. Representative compounds, thus produced, include:

4-[2-(m-fluorophenyl)-3,4-dicyanophenyl]-2,4-dihydro-5-[(methylamino)methyl]-3H-1,2,4-triazol-3-one;
4-[2-benzoyl-5-(trifluoromethyl)phenyl]-2,4-dihydro-5-[(dimethylamino)methyl]-3H-1,2,4-triazol-3-one;
4-[2-(o-propylthiobenzoyl)-6-ethoxyphenyl]-2-methyl-2,4-dihydro-5-[(methylpropylamino)methyl]-3H-1,2,4-triazol-3-one;
4-[2-(p-diethylaminobenzoyl)-4-(ethylsulfonyl)phenyl]-2,4-dihydro-5-[(propylamino)methyl]-3H-1,2,4-triazol-3-one;
4-[2-(m-nitrobenzoyl)-3-fluorophenyl]-2-propyl-2,4-dihydro-5-[1-(dipropylamino)propyl]-3H-1,2,4-triazol-3-one;
4-[2-(o-cyanobenzoyl)-3-methyl-5-bromophenyl]-2,4-dihydro-5-[(diethylamino)methyl]-3H-1,2,4-triazol-3-one;
4-[2-(2,4-dipropylbenzoyl)-4-(ethylthio)phenyl]-2-methyl-2,4-dihydro-5-[(methylethylamino)ethyl]-3H-1,2,4-triazol-3-one;
4-[2-(2,6-dichlorobenzoyl)-5-(propylsulfonyl)phenyl]-2-methyl-2,4-dihydro-5-[(dimethylamino)methyl-3H-1,2,4-triazol-3-one;
4-(2-benzoyl-4,6-dibromophenyl)-5-[1-(diethylamino)ethyl]-2,4-dihydro-3H-1,2,4-triazol-3-one;
4-[2-(2,6-difluorobenzoyl)-4-chlorophenyl]-2,4-dihydro-5-[(ethylpropylamino)methyl]-3H-1,2,4-triazol-3-one; and the like.

Treating the compounds of Formula IV with pharmacologically acceptable acids such as hydrochloric, hydrobromic, phosphoric, sulfuric, acetic, propionic, toluenesulfonic, methanesulfonic, tartaric, citric, lactic, malic, maleic, cyclohexanesulfamic acids, and the like produces the pharmacologically acceptable salts of these compounds of Formula IV which can be used like the free base compounds of Formula IV. Salt formation is achieved in conventional manner by reacting the compounds of Formula IV with excess of a selected acid in a suitable medium e.g. water, a lower alkanol, ether, or acetone and recovering the salt by evaporating the solvent, preferably in vacuo.

What is claimed is:

1. A compound selected from the group consisting of a 4-(2-benzoylphenyl) -2,4 - dihydro - 5 - [(alkylamino)alkyl]-3H-1,2,4-triazol-3-one of the Formula IV

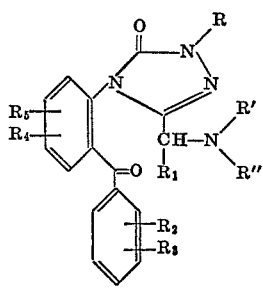

(IV)

wherein R, R' and $R_1$ are hydrogen or alkyl of 1 to 3 carbon atoms, inclusive; wherein $R_2$, $R_3$, $R_4$, and $R_5$ are selected from the group consisting of hydrogen, alkyl defined as above, fluoro, chloro, bromo, nitro, cyano, trifluoromethyl and alkoxy, alkylthio, alkylsulfinyl, and alkylsulfonyl in which the carbon moieties are of 1 to 3 carbon atoms inclusive and dialkylamino in which alkyl is defined as above; and wherein R" is alkyl defined as above, and the pharmacologically acceptable acid addition salts thereof.

2. A compound according to claim 1 wherein R, R', $R_1$, $R_2$, $R_3$, and $R_5$ are hydrogen, $R_4$ is 4-chloro, R" is methyl and the compound is therefore 4-(2-benzoyl-4-chlorophenyl)-2,4-dihydro - 5 - [(methylamino)methyl]-3H-1,2,4-triazol-3-one.

3. A compound according to claim 1, wherein R', $R_1$, $R_2$, $R_3$, and $R_5$ are hydrogen, $R_4$ is 4-chloro and R and R" are methyl and the compound is therefore 4-(2-benzoyl-4-chlorophenyl)-2,4-dihydro - 2 - methyl-5-[(methylamino)methyl]-3H-1,2,4-triazol-3-one.

4. The hydrochloric acid addition salt of the compound of claim 3.

5. A compound according to claim 1, wherein R, R', $R_3$, and $R_5$ are hydrogen, $R_2$ is o-chloro, $R_4$ is 4-chloro, R" is methyl and the compound is therefore 4-[2-(o-chlorobenzoyl)-4-chlorophenyl]-2,4-dihydro - 5 - [(methylamino)methyl]-3H-1,2,4-triazol-3-one.

6. A process for the production of a 4-(2-benzoylphenyl)-2,4-dihydro-5-[(alkylamino)alkyl]-3H-1,2,4 - triazol-3-one of the Formula II:

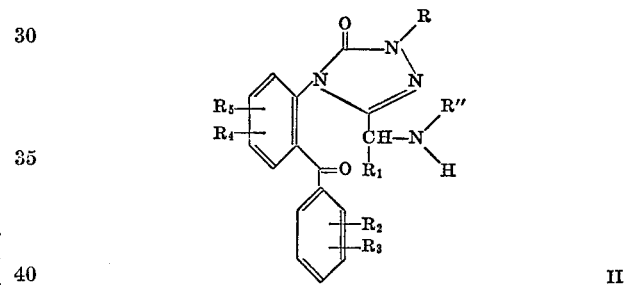

II wherein R and $R_1$ are hydrogen or alkyl of 1 to 3 carbon atoms, inclusive, wherein $R_2$, $R_3$, $R_4$, and $R_5$ are selected from the group consisting of hydrogen, alkyl defined as above, fluoro, chloro, bromo, nitro, cyano, trifluoromethyl, and alkoxy, alkylthio, alkylsulfinyl, and alkylsulfonyl in which the carbon moieties are of 1 to 3 carbon atoms inclusive, and dialkylamino in which alkyl is defined as above; and wherein R" is alkyl defined as above, which comprise: treating a 2,4-dihydro - 6 - phenyl-1H-s-triazolo [4,3-a][1,4]benzodiazepin-1-one of Formula I

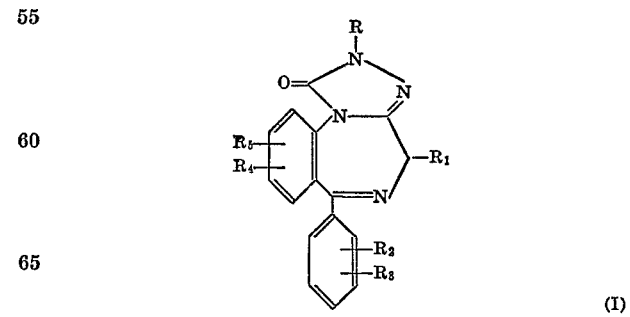

(I)

wherein R, $R_1$, $R_2$, $R_3$, $R_4$, and $R_5$ are defined as hereinabove with a trialkyloxonium fluoroborate

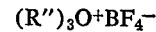

wherein R" is alkyl defined as above, at a temperature of 0–50° C. in an inert solvent and hydrolyzing the resulting complex with an aqueous base selected from aqueous solutions of potassium carbonate, sodium carbonate and sodium or potassium hydroxide, to obtain the compound of Formula II above.

7. A process according to claim 6 wherein the obtained product II is alkylated with an alkyl halide R′Br or R″ in which R′ is alkyl of 1 to 3 carbon atoms, in the presence of a base at 0–50° C.

References Cited

Derieg et al., Chemical Abstracts, vol. 74, Abstract No. 125579e (1971)

ALTON D. ROLLINS, Primary Examiner

U.S. Cl. X.R.

260—239.3 D; 424—269